United States Patent [19]

Bristow et al.

[11] 4,016,362
[45] Apr. 5, 1977

[54] MULTIPLE IMAGE POSITIONING CONTROL SYSTEM AND METHOD

[75] Inventor: Stephen D. Bristow, San Jose; Steven T. Mayer, Auburn, both of Calif.

[73] Assignee: Atari, Inc., Sunnyvale, Calif.

[22] Filed: Oct. 29, 1975

[21] Appl. No.: 626,665

[52] U.S. Cl. .......................... 358/142; 178/DIG. 6; 340/324 AD

[51] Int. Cl.² .................... H04N 5/22; G08B 23/00

[58] Field of Search ....................... 178/DIG. 6, 6.8; 340/324 AD; 315/377; 273/DIG. 28, 85 R

[56] References Cited

UNITED STATES PATENTS

| | | | |
|---|---|---|---|
| 3,728,480 | 4/1973 | Baer | 178/6.8 |
| 3,778,058 | 12/1973 | Rausch | 273/85 R |

*Primary Examiner*—John C. Martin
*Attorney, Agent, or Firm*—Flehr, Hohbach, Test, Albritton & Herbert

[57] ABSTRACT

A system and method utilizing a single motion control circuit or comparator for controlling the display of a plurality of moving images on a video screen. At the outset of each frame, position data for the images is arranged according to the order at which the images are to appear in that frame. In one embodiment, numbers corresponding to the distance between successive images along the path of the beam are stored, and pulses corresponding to the position of the beam are counted to determine when the position of the beam corresponds to the locations at which the images are to be displayed. In a second embodiment, the image location data is compared with signals corresponding to the position of the beam to determine when it reaches the locations at which the images are to be displayed.

16 Claims, 2 Drawing Figures

MULTIPLE IMAGE POSITIONING CONTROL SYSTEM AND METHOD

BACKGROUND OF THE INVENTION

This invention pertains generally to the display of video images and more particularly to a system and method for controlling the display of a plurality of images of moving objects.

Heretofore, electronic video amusement games have been provided in which images of objects are caused to move about on the screen of a video display tube under control of an operator or in response to control signals generated by circuitry within the game. One example of a system for controlling the position of an image in such a game is found in U. S. Pat. No. 3,793,483, issued Feb. 19, 1974 to the assignee herein.

In the past, a separate motion counting or comparator circuit has generally been required for each moving object to be displayed. With multiple objects, multiple counters or comparators are required, and this can result in relatively complex and expensive circuitry.

SUMMARY AND OBJECTS OF THE INVENTION

The invention utilizes a single motion counting circuit or comparator for controlling the display of a plurality of moving images. Position data for the object is arranged at the outset of each frame according to the order in which the images are to appear in that frame. In one embodiment, numbers corresponding to the distance between successive images along the path of the beam are stored, and pulses corresponding to the position of the beam are counted to determine when the position of the beam corresponds to the locations at which the images are to be displayed. In a second embodiment, the image location data is compared with signals corresponding to the position of the beam to determine when the beam reaches the locations at which the images are to be displayed.

It is in general an object of the invention to provide a new and improved system and method for controlling the position of images on a video display screen.

Another object of the invention is to provide a system and method of the above character which are particularly suitable for use in video amusement games.

Another object of the invention is to provide a system and method of the above character utilizing a single counting circuit or comparator for controlling the display of a plurality of moving images.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
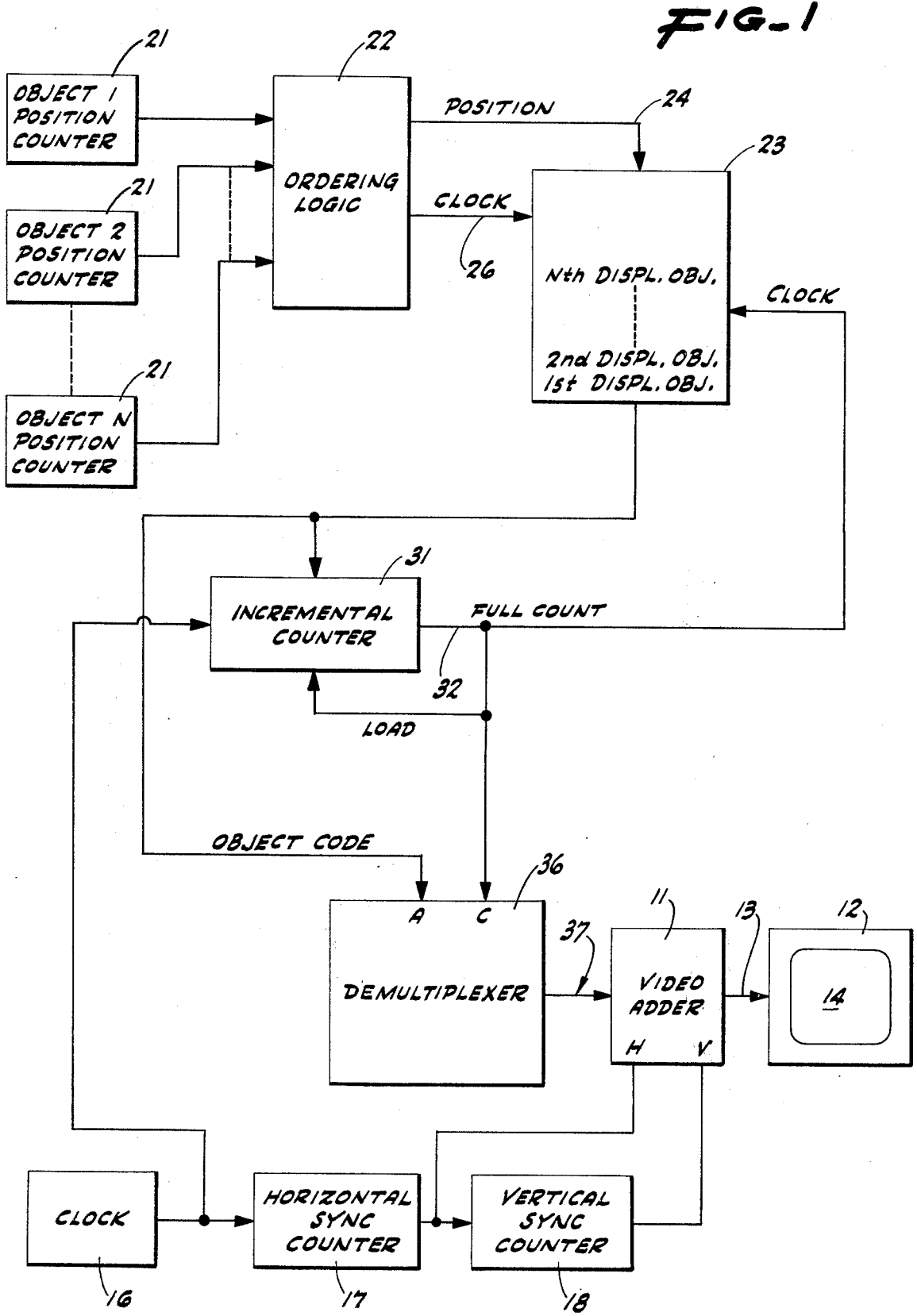
FIG. 1 is a block diagram of one embodiment of a video image control system according to the invention.

The system illustrated in FIG. 1 includes a video adder 11 and a video display tube 12, with the output of the adder connected to the tube by a line 13. The video adder is of a known design and serves to combine information signals with horizontal sync pulses and vertical sync pulses to provide a composite video signal on line 13. The display tube is likewise of known design and it includes a luminescent display screen in which is scanned in horizontal and vertical directions by an electron beam to provide a raster on which successive frames of the picture can be displayed.

Sync pulses are applied to the video adder by a sync circuit comprising a clock source 16, a horizontal sync counter 17, and a vertical sync counter 18. The clock source is of conventional design, and it delivers clock pulses at a suitable frequency, e.g. 7MHz, to the clock input of the horizontal sync counter. In the preferred embodiment, this counter is divide-by-256 counter, and the output of this counter is connected to the horizontal sync input of adder 11 and to the clock input of vertical sync counter 18. Counter 18 is also a divide-by-256 counter, and its output is connected to the vertical sync input of video adder. The sync pulses from counters 17 and 18 serve to control the movement of the beam in display tube 12 in a known manner along a path comprising a plurality of vertically displaced horizontal lines. With the divide-by-256 counters of the embodiment disclosed, the raster consists of 256 horizontal lines.

Signals corresponding to the locations on the screen at which images of objects are to be displayed are provided by object position counters 21. One such counter is provided for each of the objects. In the preferred embodiment, the counters are binary up/down counters, and the counts provided thereby represent the horizontal and vertical coordinates of the point on the display screen at which the images begin during each frame. For each image, the starting point is the point of the image which the beam first reaches as it traverses the screen along the predetermined path for each frame. The position of an image can be changed to effect motion in successive frames by incrementing or decrementing the corresponding counter.

Means is provided for arranging the data from counters 21 according to the order of the starting points of the images along the path of the display tube beam. This means includes an ordering logic network 22 and a position file 23 comprising a suitable storage device such as a shift register or a sequentially organized memory. The outputs of counter 21 are connected to the input of the logic network, and the output of this network is connected to the input of the storage device by a data line 24. Clock pulses from the logic network are applied to the storage device on a clock line 26. In addition to arranging the data from the position counters in the order of display, logic network 22 provides signals corresponding to the incremental distances along the path of the beam between the starting points of successive images. These signals are stored in the storage device along with identification codes for the objects in the order in which the images are to be displayed in each frame.

Means is provided for comparing the data from storage device 23 with data indicative of the beam position to determine when the position of the beam corresponds to the starting point of the image. This means includes an incremental counter 31 which receives clock pulses from clock 16. The incremental displacement data is applid to a second input of counter 31, and when the number of clock pulses counted equals the count represented by the data, the counter delivers an output signal on line 32. This line is connected to the storage device and to a control input of counter 31 for effecting transfer of the data from the position file to the counter.

The output of the counter 31 is connected to the clock input of a demultiplexer 36, and the output of position file 23 is connected to the address input of the demultiplexer. The demultiplexer is of known design and has a plurality of output lines 37 to which output pulses from counter 31 are directed in accordance with the object code signals from position file 23. In the embodiments illustrated, output lines 37 are connected directly to the information inputs of video adder 11. However, it should be understood that this connection is shown by way of example only and that the pulses on the output lines can be otherwise processed or utilized, if desired. For example, they can be stretched, modified in another manner, or utilized to enable the passage of other data to the video adder.

Operation and use of the system of FIG. 1 and therein the method of the invention can be described as follows. At the outset of each frame of the picture, counter 31 is reset to zero and the data from object position counter 21 is read by ordering logic network 22. The logic network delivers position information for each object to position file 23 where it is stored in the order in which the objects will be displayed during the frame. In addition to ordering the data, the logic network calculates the displacement between the starting points of the successive objects, and this displacement information is stored in the position file along with a code identifying each object.

The ordering and storage of data in the position file occurs during the vertical blanking interval of the video tube display. At the start of the active display for each frame, the data representing the distance to the first object to be displayed is loaded into incremental counter 31 from position file 23. At the same time, demultiplexer 36 is addressed by the identification code for each object from the position file. Counter 31 counts the clock pulses, and when the count reaches the level of the number represented by the data from the position file, counter 31 delivers a pulse on output line 32 to the clock input of demultiplexer 36. Upon receipt of this pulse, the demultiplexer delivers an output pulse for the object on the output line 37 previously addressed by the object identification code. Video adder 11 combines this information signal for the object with the horizontal and vertical sync signals and delivers a composite video signal to display tube 12 for display on screen 14.

The output pulse from counter 31 causes position file 23 to advance and output the data for the next object to be displayed. This same pulse also causes the counter to load the new data from the position file and conditions the demultiplexer to read the next object identification code from the position file. The process continues for all of the objects to be displayed in the frame. At the end of the frame the position file is reloaded with the data for the next frame, and the process continues for each successive frame. Movement of the individual objects on the display can be effected simply by incrementing or decrementing the counts in the position counters for the respective objects.

Figure 2:
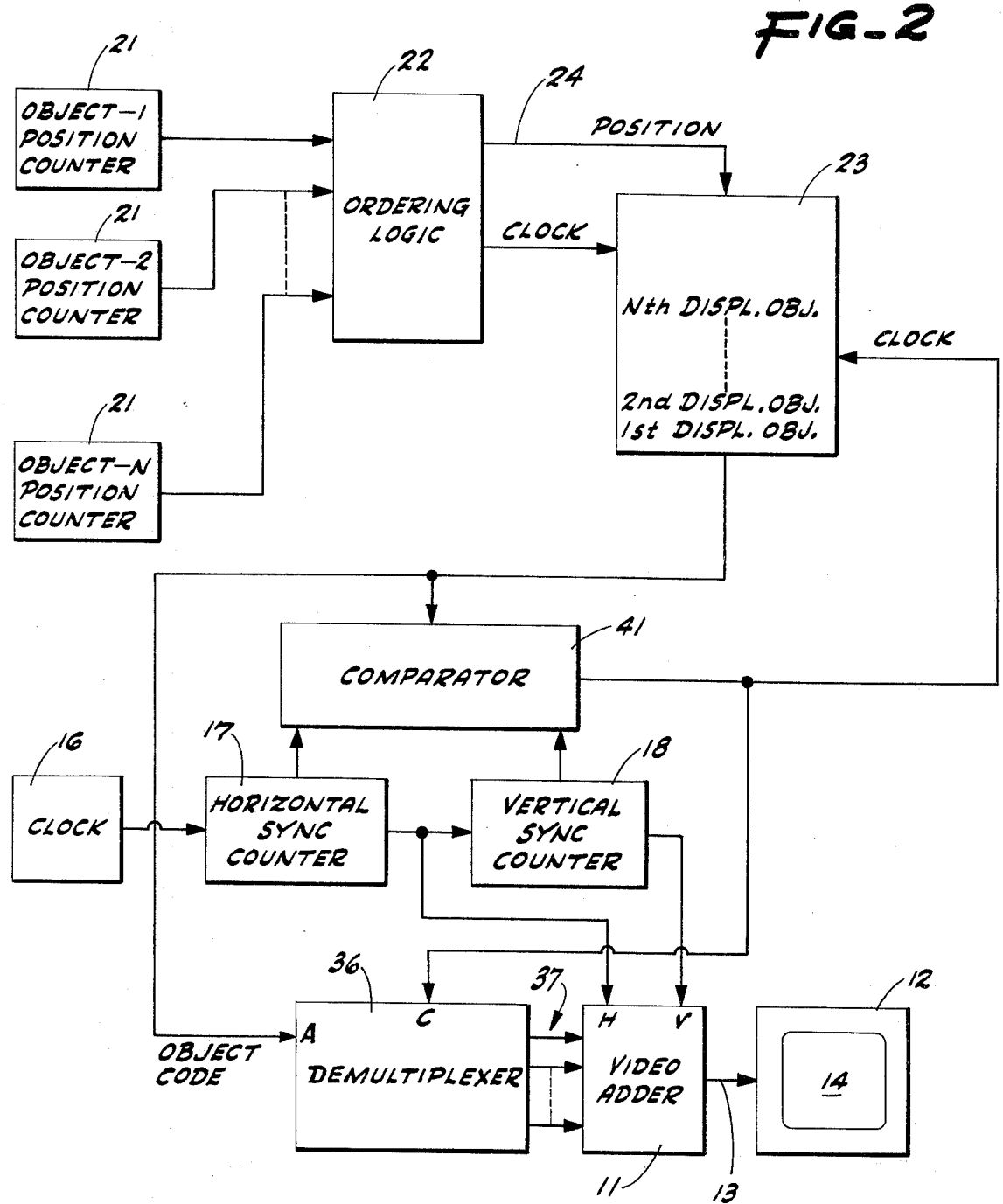
FIG. 2 is a block diagram of a second embodiment of a video image control system according to the invention.

The system illustrated in FIG. 2 is generally similar to the system of FIG. 1 except that it utilizes a comparator 41 in place of counter 31. In this embodiment, the position data stored in position file 23 is simply the horizontal and vertical coordinates of the starting points of the objects, and this data is applied to one input of comparator 41. The comparator receives additional input data from horizontal sync counter 17 and vertical sync counter 18 corresponding to the position of the beam on the display screen. The output of the comparator is connected to the clock inputs of position file 23 and demultiplexer 36.

Operation and use of the embodiment of FIG. 2 is generally similar to that of the embodiment of FIG. 1. However, in the system of FIG. 2, the object position data from position file 23 is compared directly with the horizontal and vertical sync pulse counts which determine the position of the beam. When the count in the sync counters corresponds to the number represented by the display position data, comparator 41 delivers an output pulse which serves to clock multiplexer 36 and to advance position file 23 to output data for the next object to be displayed.

The invention has a number of important features and advantages. It provides an inexpensive means of displaying a plurality of moving objects with a single motion counting circuit, i.e. counter 31 and comparator 41. This technique requires substantially fewer components than prior art techniques for creating motion of video images, and with the advent of microprocessing computers on a single chip, object position counter 21, ordering logic network 22, and position file 23 can be constructed in a single integrated circuit.

It is apparent from the foregoing that a new and improved system and method for controlling the position of multiple video images have been provided. While only certain presently preferred embodiments have been described, as will be apparent to those familiar with the art, certain changes and modifications can be made without departing from the scope of the invention as defined by the following claims.

What is claimed is:

1. In a method of controlling the display of images of a plurality of objects at different locations on a video display screen scanned in successive frames by an image forming beam traversing the screen along a predetermined path, the steps of: providing data indicative of the locations at which the images are to be displayed during each frame, arranging the data for each frame according to the order of the image locations along the path of the beam, comparing the image location data with data corresponding to the position of the beam, and providing an output display signal when the position of the beam corresponds to the location at which an image is to be displayed.

2. The method of claim 1 wherein the image location data is changed in successive frames to effect movement of the images.

3. The method of claim 1 wherein the image location data comprises a number corresponding to the distance along the path of the beam between the locations of successive ones of the images and the image location data is compared with the beam position data by counting pulses occurring at a rate corresponding to the scan rate of the beam until the number of pulses counted equals the number corresponding to the distance between successive image locations.

4. The method of claim 1 wherein the image location data is compared with signals corresponding to the horizontal and vertical positions of the beam.

5. In a system for controlling the display of images of a plurality of objects at different locations on a video display screen scanned in successive frames by an image forming beam traversing the screen along a predetermined path: means for providing data indicative of the locations at which the images are to be displayed during each frame, means for arranging the data for each frame according to the order of the image locations along the path of the beam, means for compared the arranged data with data corresponding to the position of the beam, and means responsive to the last named means for delivering an output display signal when the position of the beam corresponds to the location at which an image is to be displayed.

6. The system of claim 5 wherein the means for providing location data for each of the images comprises a counter which can be advanced to change the location of the image in successive frames.

7. The system of claim 5 wherein the image location data comprises a number corresponding to the distance along the path of the beam between the locations of successive ones of the images and the means for comparing the data comprises a counter adapted for counting pulses occurring at a rate corresponding to the scan rate of the beam and delivering an output signal when the number of pulses counted equals the number corresponding to the distance between successive image locations.

8. The system of claim 5 wherein the means for comparing the data comprises a comparator for comparing the image location data with signals corresponding to horizontal and vertical positions of the beam.

9. In a method of controlling the display of images of a plurality of objects at different locations on a video display screen scanned in successive frames by an image forming beam traversing the screen along a predetermined path in response to sync signals, the steps of: providing data indicative of the locations at which the images are to be displayed during each frame, processing the image location data to determine the order of the image locations along the path of the beam for each frame, providing numbers representative of the distances along the path of the beam between the locations of successive ones of the images, counting pulses corresponding to the position of the beam, and delivering output display signals when the count corresponds to the numbers representative of the distances between the image locations.

10. The method of claim 9 wherein the image location data is changed in successive frames to effect movement of the images.

11. In a system for controlling the display of images of a plurality of objects at different locations on a video display screen scanned in successive frames by an image forming beam traversing the screen along a predetermined path in response to sync signals: means for providing data indicative of the locations at which the images are to be displayed during each frame, means responsive to the image location data for providing numbers representative of the distances along the path of the beam between the locations of successive ones of the images, counter means responsive to pulse signals corresponding to the position of the beam, and means for delivering output display signals when the count in the counter corresponds to the numbers representative of the distances between the image locations.

12. The system of claim 11 wherein the means for providing image location data comprises a counter which can be advanced to change the location of one of the images in successive frames.

13. In a method of controlling the display of images of a plurality of objects at different locations on a video display screen scanned in successive frames by an image forming beam traversing the screen along a plurality of horizontal lines in response to horizontal and vertical sync signals, the steps of: providing data indicative of the locations at which the images are to be displayed during each frame, arranging the image location data for each frame according to the order of the image locations along the path of the beam, providing beam position signals corresponding to the position of the beam and having a predetermined time relation to the sync signals, comparing the location data for each successive image with the beam position signals, and delivering an output display signal when the position of the beam corresponds to the location at which an image is to be displayed.

14. The method of claim 13 wherein the image location data is changed in successive frames to effect movement of the images.

15. In a system for controlling the display of images of a plurality of objects at different locations on a video display screen scanned in successive frames by an image forming beam traversing the screen along a plurality of horizontal lines in response to horizontal and vertical sync signals: means for providing data indicative of the locations at which the images are to be displayed during each frame, means for arranging the image location data for each frame according to the order of the image locations along the path of the beam, means for providing beam position signals corresponding to the position of the beam and having a predetermined time relating to the sync signals, comparator means for comparing the location data for successive images with the beam position signals, and means responsive to the comparator means for delivering output display signals when the position of the beam corresponds to the locations at which the images are to be displayed.

16. The system of claim 15 wherein the means for providing image location data comprises a counter which can be advanced to change the location of one of the images in successive frames.

* * * * *